United States Patent [19]

Guasch

[11] Patent Number: 5,022,770
[45] Date of Patent: Jun. 11, 1991

[54] ROTATING AND SEALED BEARING ASSEMBLY OF A FIRST MEMBER ROTATING IN A SECOND MEMBER

[75] Inventor: Esteve C. Guasch, Barcela, Spain

[73] Assignee: Bendix Espana S.A., Barcelona, Spain

[21] Appl. No.: 543,626

[22] Filed: Jun. 26, 1990

[30] Foreign Application Priority Data

Aug. 7, 1989 [ES] Spain .................................. 8902799

[51] Int. Cl.⁵ ........................ F16C 33/72; F16C 33/58
[52] U.S. Cl. .................................... 384/477; 384/486; 384/513
[58] Field of Search ............................... 384/490–492, 384/513–516, 452, 453, 456, 477, 484, 599, 505, 569

[56] References Cited

U.S. PATENT DOCUMENTS

| | | | |
|---|---|---|---|
| 3,317,257 | 5/1967 | Oddsen | 384/516 |
| 4,672,884 | 6/1987 | Rosell et al. | 91/375 R |
| 4,749,287 | 6/1988 | Anguera | 384/484 |
| 4,780,004 | 10/1988 | Anguera | 384/505 X |

FOREIGN PATENT DOCUMENTS

| | | | |
|---|---|---|---|
| 2124247 | 11/1972 | Fed. Rep. of Germany | 384/490 |
| 1111621 | 3/1956 | France | 384/505 |
| 2123096 | 1/1984 | United Kingdom | 384/484 |

*Primary Examiner*—Thomas R. Hannon
*Attorney, Agent, or Firm*—Larry J. Palguta; Ken C. Decker

[57] ABSTRACT

This invention relates to a rotating and sealed bearing assembly of a first member (12) rotating in a second member (10), comprising a bearing outer track structure (28) mounted in a bore (11) of the second member traversed by the first member (12) and bearing a lip seal (40), the bearing inner track (24) being formed on the first member (12), the bearing outer track structure being made of a sheet steel backing plate (28) shaped in order to a present an intermediate zone of rounded profile (26) forming the bearing outer track.

According to the invention, the intermediate zone (26) is extended on one side by a first end zone (30) extending axially and on the other side by a second end zone (36) extending axially, the second end zone (36) being connected to the intermediate zone (26) by a median zone (34) extending radially.

8 Claims, 1 Drawing Sheet

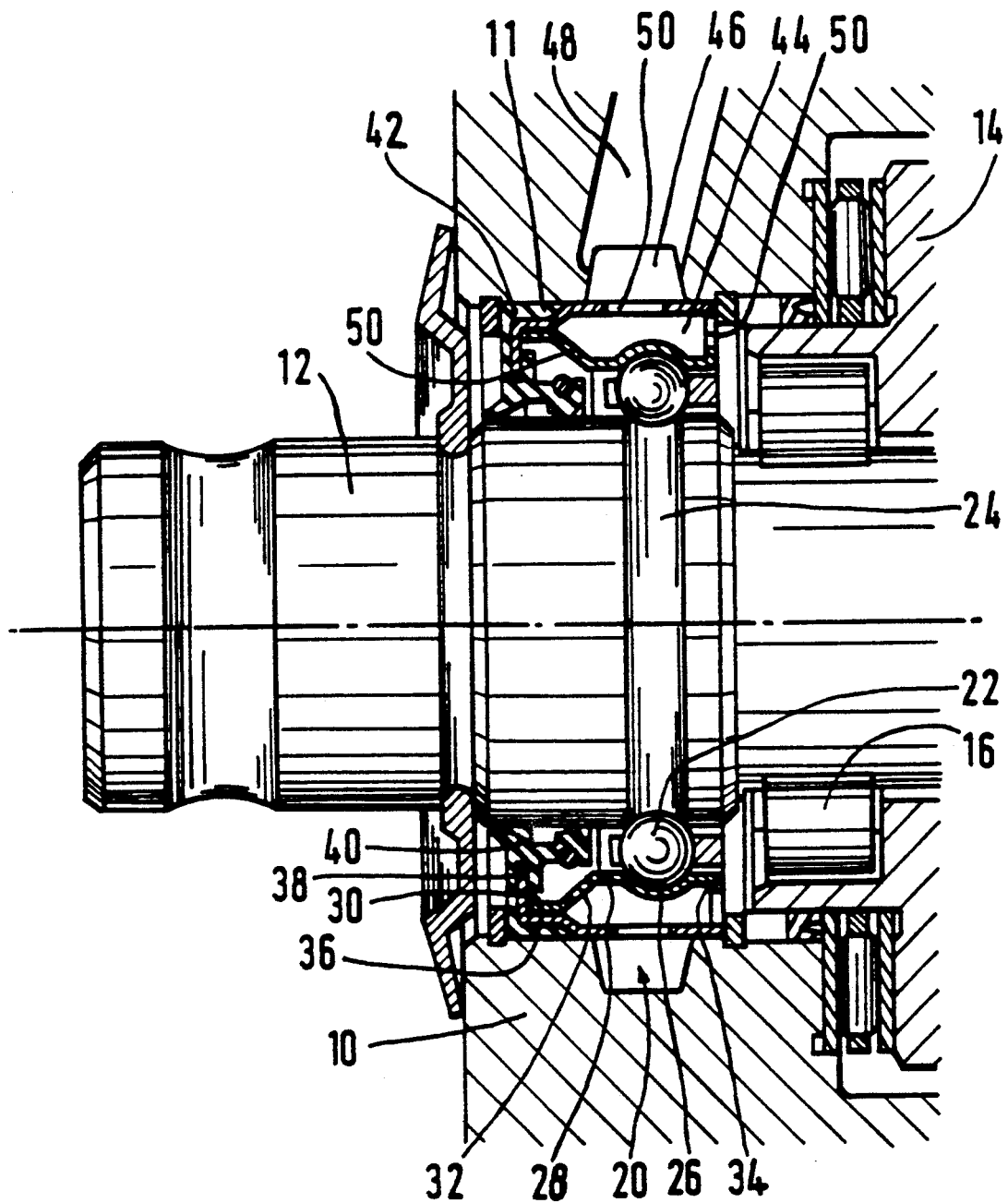

ROTATING AND SEALED BEARING ASSEMBLY OF A FIRST MEMBER ROTATING IN A SECOND MEMBER

SUMMARY OF THE INVENTION

The object of the present invention is to provide an assembly of the above-mentioned type, of rugged and light design and with low manufacturing and assembling costs, suitable for very considerable mass production.

To do this, according to a feature of the invention, the intermediate zone of rounded profile forming the bearing outer track extends, on one side, by a first end zone being connected to the intermediate zone by a median zone extending radially.

Another object of the present invention is to provide an assembly of the type considered enabling a compact design without altering hardiness.

To do this, according to an advantageous feature of the invention, the bearing outer track structure defines an annular chamber communicating, by way of openings, with an annular groove, formed in the bore of the second element and connected by a duct to a reservoir or a hydraulic fluid source, and with the bore.

Still another object of the present invention is to provide an assembly of the type considered enabling static sealing of the assembly to be ensured axially, on both sides, besides dynamic sealing by the lip seal, without excessive manufacturing costs.

To do this, according to another feature of the invention, the second end zone bears in addition a static seal interacting in engagement contact with the bore formed in the second element, the static seal and the lip seal being moulded with advantage on an end turned back radially of the second end zone.

BRIEF DESCRIPTION OF THE DRAWINGS

Other features and advantages of the present invention will become evident from the following description of an embodiment, given by way of illustration but in no way limiting, made with reference to the accompanying drawing, in which:

Sole Figure is a partial view in longitudinal section of a rotating hydraulic distributor for power-assisted steering having a rotating and sealed bearing assembly according to the invention.

DETAILED DESCRIPTION OF THE INVENTION

The input part of a hydraulic distributor for power-assisted steering of vehicles of the type described in the U.S. Pat. No. 4,672,884, is shown diagrammatically in the Figure.

Such distributor is usually mounted in a housing 10 formed With a bore 11 inside through which extends an input shaft 12 intended to be connected to the steering wheel of a motor vehicle. The input shaft 12 is coupled to an output shaft 14, hydraulically by means of star-shaped valve device (not shown) and mechanically by a lost travel flexible coupling having a set of C-shaped springs 16.

According to the invention, a rotating and sealed bearing assembly 20 is provided between the housing 10 and the input-shaft 12. The ball bearings 22 are located between a bearing inner track 24 formed on the output shaft 12, and a bearing outer track constituted by an intermediate zone of rounded profile 26 in a sheet steel backing plate 28. The intermediate zone 26 is extended, on one side, by a first end zone 30 extending axially, this first end zone, in the illustrated example, being joined with the intermediate zone 26 by a frustoconical part 32 of the sheet steel backing plate 28 in order for the diameter of the first end zone to be greater than the average diameter of the intermediate zone 26.

The intermediate zone 26 is extended, on the other side, by a median zone 34 extending radially outwardly, which itself is extended axially in the same direction as the first end zone 30. This second end zone 36 is terminated by an end section 38 extending radially inwardly on which a structure of lip seal 40 is molded.

In the preferred embodiment shown, the second end zone 36 extends some distance axially, radially, inwardly from the wall of the bore 11, a static tubular seal 42, with advantage molded in a single piece with the lip seal 40, being inserted compressed between the second end zone 36 and the wall of the bore 11 so as to insulate, dynamically as well as statically, the inner part of the bore 11 from the outside of the housing 10.

In order to increase the hardiness of the sheet steel backing plate 28, the first and second end zones 30 and 36 are joined, and the first end zone 30 comes to bear axially against the end section 38 turned back radially inwardly of the second end zone 36.

The sheet steel backing plate 28 defining the bearing outer track defines also an annular chamber 44 between the bearing outer track and the wall of the bore 11. According to an advantageous feature of the invention, this annular chamber 44 takes a part either in the feeding of the distributor from a source of hydraulic fluid under pressure or in the removal of hydraulic fluid to a reservoir.

For this purpose, an annular groove 46 is formed in the bore 11, between the median part 34 and the second end zone 36, and a drilling 48 in the housing 10 opens in the annular groove 46 and establishes a duct for hydraulic fluid from a source or to a reservoir. Openings 50 in the sheet steel backing plate 28 allow the hydraulic fluid to flow through the bearing outer track structure from or to the inner part of the bore 11 and the distributor.

Although the present invention has been described relative to a particular embodiment, it is not in fact limited thereby but is, on the contrary, amenable to modifications and variations which will be apparent to the person skilled in the art, particularly concerning the detail forms and the respective dimensions of the end zones 30 and 36.

What we claim is:

1. A rotating and sealed bearing assembly of a first member rotating in a second member, comprising a bearing outer track structure mounted in a bore of the second member traversed by the first member and bearing a lip seal, a bearing inner track being formed on the first member, the bearing outer track structure being made of a sheet steel backing plate shaped in order to present an intermediate zone of rounded profile forming the bearing outer track structure, the intermediate zone being extended on one side by a first end zone extending axially and on the other side by a second end zone extending axially, the second end zone being connected to the intermediate zone by a median zone extending radially, the second end zone extending axially in the same direction of the first end zone, the second end zone being joined with the first end zone, and the sheet steel backing plate defining an annular chamber between the bearing outer track structure and the bore of the second member.

2. The assembly according to claim 1, wherein openings are made in the sheet steel backing plate in order to communicate the annular chamber with an annular groove and with an inner part of the bore.

3. A rotating and sealed bearing assembly of a first member rotating in a second member, comprising a bearing outer track structure mounted in a bore of the second member traversed by the first member and bearing a lip seal, a bearing inner track being formed on the first member, the bearing outer track structure being made of a sheet steel backing plate shaped in order to present an intermediate zone of rounded profile forming the bearing outer track structure, the intermediate zone being extended on one side by a first end zone extending axially and on the other side by a second end zone extending axially, the second end zone being connected to the intermediate zone by a median zone extending radially, an annular groove being formed in the bore of the second member, and the annular groove being connected by a duct to one of a reservoir of hydraulic fluid and a source of hydraulic fluid under pressure.

4. The assembly according to claim 3, wherein openings are made in the sheet steel backing plate in order to communicate an annular chamber with the annular groove and with an inner part of the bore.

5. A rotating and sealed bearing assembly of a first member rotating in a second member, comprising a bearing outer track structure mounted in a bore of the second member traversed by the first member and bearing a lip seal, a bearing inner track being formed on the first member, the bearing outer track structure being made of a sheet steel backing plate shaped in order to present an intermediate zone of rounded profile forming the bearing outer track structure, the intermediate zone being extended on one side by a first end zone extending axially and on the other side by a second end zone extending axially, the second end zone being connected to the intermediate zone by a median zone extending radially, and the second end zone bearing a static seal interacting in engagement contact with the bore.

6. The assembly according to claim 5, wherein the lip seal comprises an elongated peripheral part forming said static seal.

7. A rotating and sealed bearing assembly of a first member rotating in a second member, comprising a bearing outer track structure mounted in a bore of the second member traversed by the first member and bearing a lip seal, a bearing inner track being formed on the first member, the bearing outer track structure being made of a sheet steel backing plate shaped in order to present an intermediate zone of rounded profile forming the bearing outer track structure, the intermediate zone being extended on one side by a first end zone extending axially and on the other side by a second end zone extending axially, the second end zone being connected to the intermediate zone by a median zone extending radially, the lip seal being molded on an end section turned back radially of the second end zone, and the lip seal comprising an elongated peripheral part forming a static seal.

8. A rotating and sealed bearing assembly of a first member rotating in a second member, comprising a bearing outer track structure mounted in a bore of the second member traversed by the first member and bearing a lip seal, a bearing inner track being formed on the first member, the bearing outer track structure being made of a sheet steel backing plate shaped in order to present an intermediate zone of rounded profile forming the bearing outer track structure, the intermediate zone being extended on one side by a first end zone extending axially and on the other side by a second end zone extending axially, the second end zone being connected to the intermediate zone by a median zone extending radially, the lip seal being molded on an end section turned back radially of the second end zone, and the first end zone coming to bear axially against the end section which is turned back radially inwardly of the second end zone.

* * * * *